(12) United States Patent
Dowdey et al.

(10) Patent No.: US 7,213,854 B2
(45) Date of Patent: May 8, 2007

(54) REMOVABLE T-TOP STOWAGE ON ROOF RACK

(75) Inventors: Christopher C. Dowdey, Grosse Ile, MI (US); Robert F. Hunwick, Jr., Sterling Heights, MI (US); Marques B. McCammon, East Pointe, MI (US); Arthur L. MacNee, III, Southgate, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 11/172,364

(22) Filed: Jun. 30, 2005

(65) Prior Publication Data

US 2007/0001486 A1 Jan. 4, 2007

(51) Int. Cl.
*B60P 3/00* (2006.01)
(52) U.S. Cl. .................. 296/3; 296/37.7; 296/218
(58) Field of Classification Search .............. 396/3, 396/218, 37.7; 224/309, 315, 324
See application file for complete search history.

(56) References Cited

U.S. PATENT DOCUMENTS

| | | | |
|---|---|---|---|
| 4,467,944 A | 8/1984 | Manko et al. | |
| 4,637,649 A * | 1/1987 | Cambria | 296/224 |
| 4,729,596 A | 3/1988 | Fujihara et al. | |
| 4,729,597 A | 3/1988 | Fujihara et al. | |
| 4,852,938 A | 8/1989 | Hirshberg et al. | |
| 4,971,370 A | 11/1990 | Detweiler et al. | |
| 4,979,384 A | 12/1990 | Malesko et al. | |
| 5,031,949 A | 7/1991 | Sorimachi et al. | |
| 5,158,335 A * | 10/1992 | Usuta et al. | 49/476.1 |
| 5,360,254 A | 11/1994 | Sorimachi et al. | |
| 5,725,273 A | 3/1998 | Vernon et al. | |
| 6,039,391 A | 3/2000 | Takahashi | |
| 6,309,007 B1 * | 10/2001 | Essig et al. | 296/103 |
| 6,338,509 B1 * | 1/2002 | Rice et al. | 292/223 |
| 6,767,047 B2 | 7/2004 | Eichhorst et al. | |
| 6,866,322 B2 | 3/2005 | Willard | |
| 2003/0141735 A1 * | 7/2003 | Albaisa et al. | 296/37.7 |
| 2005/0073179 A1 * | 4/2005 | Williams | 296/218 |
| 2005/0134096 A1 * | 6/2005 | Fallis et al. | 296/218 |

* cited by examiner

*Primary Examiner*—Lori L. Lyjak
(74) *Attorney, Agent, or Firm*—Harness, Dickey & Pierce, P.L.C.

(57) ABSTRACT

A vehicle panel stowage system advantageously provides for stowage of a removable vehicle panel on the exterior of the vehicle. The panel can be stowed substantially flush with a stowage rack on the exterior of the vehicle. The stowage system advantageously protects portions of the removable panel from the environment when positioned on the stowage rack.

42 Claims, 13 Drawing Sheets

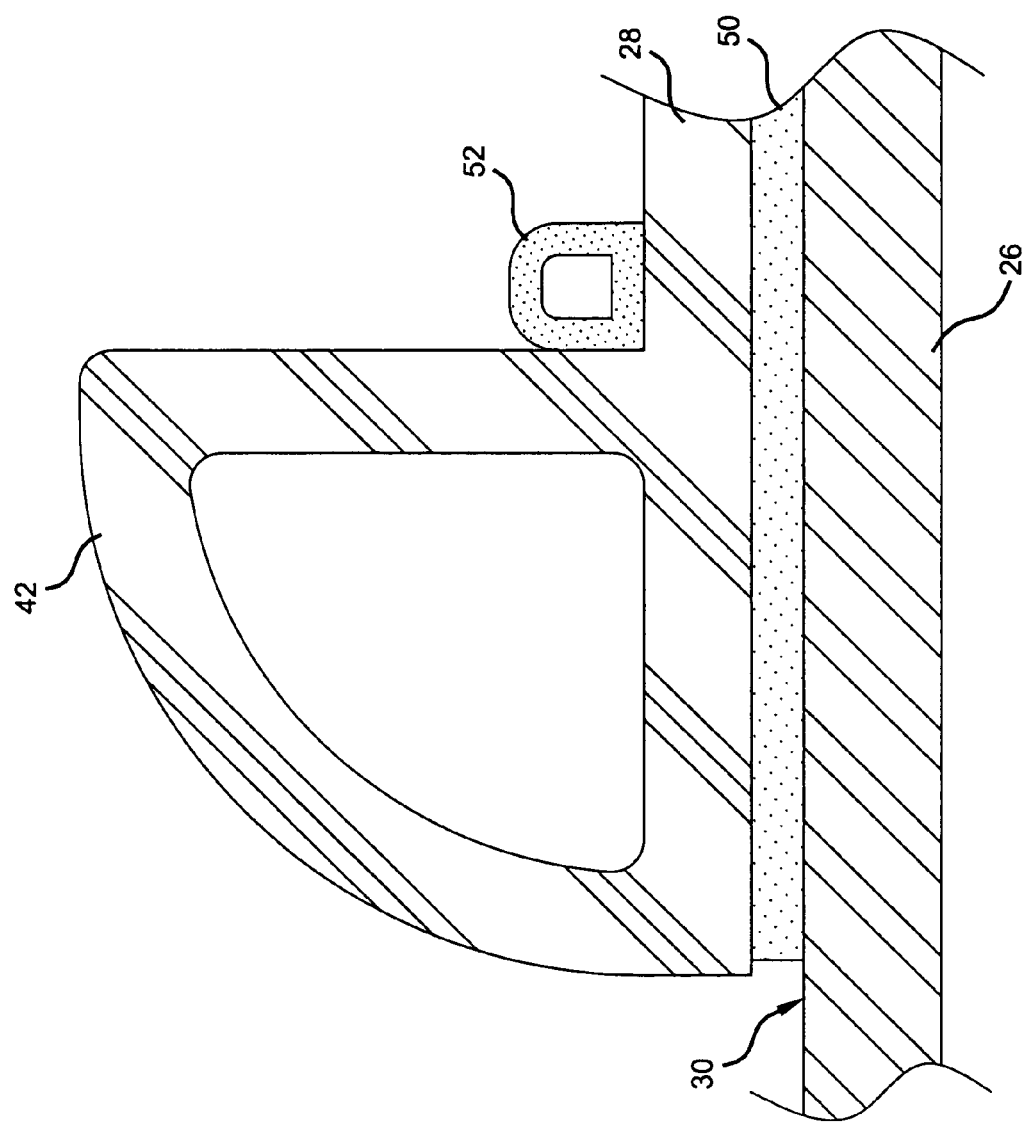

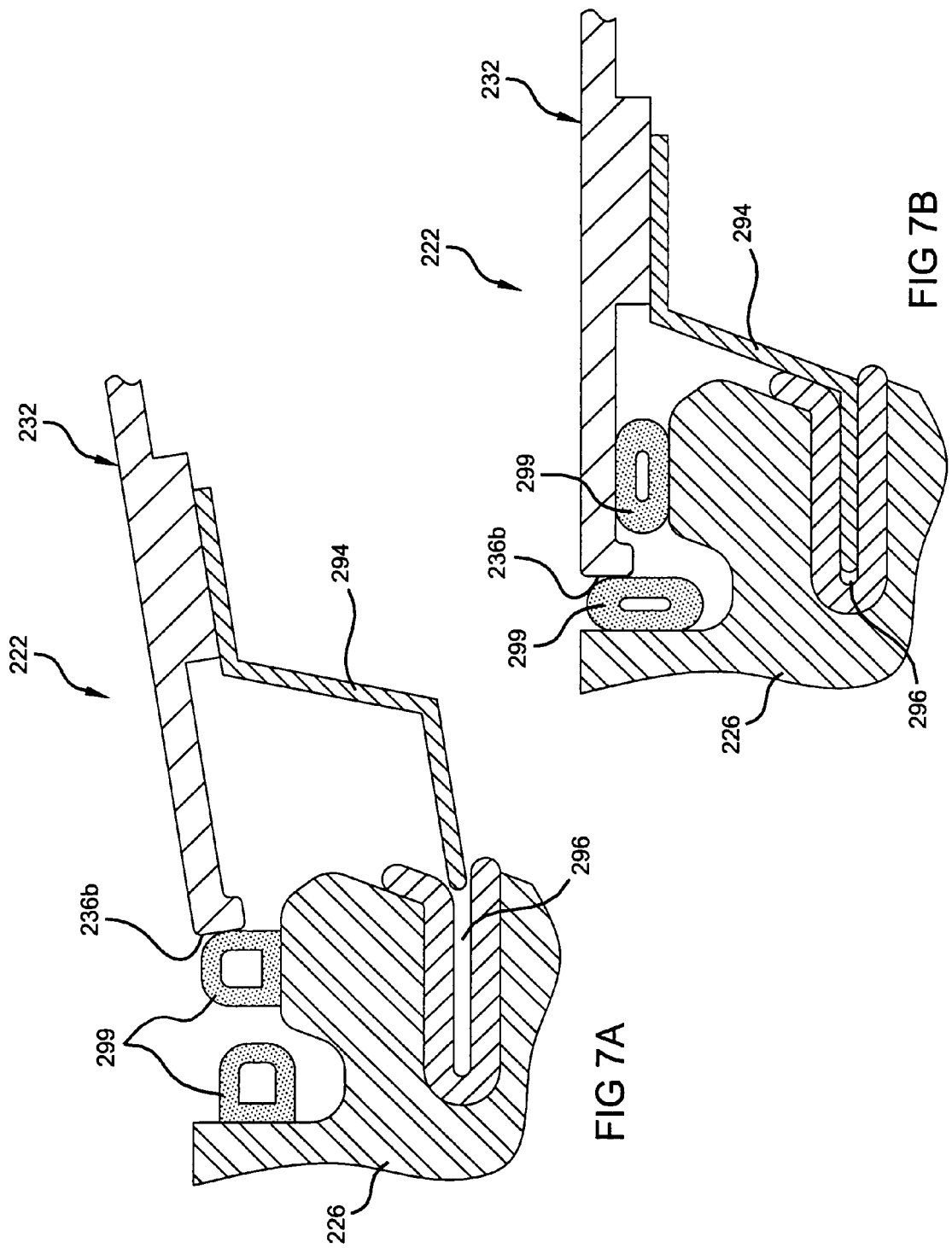

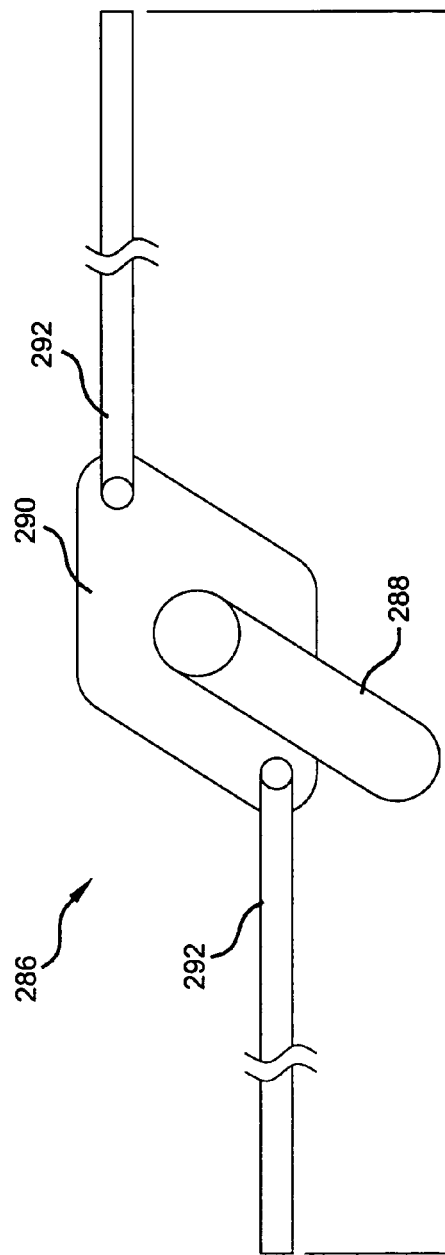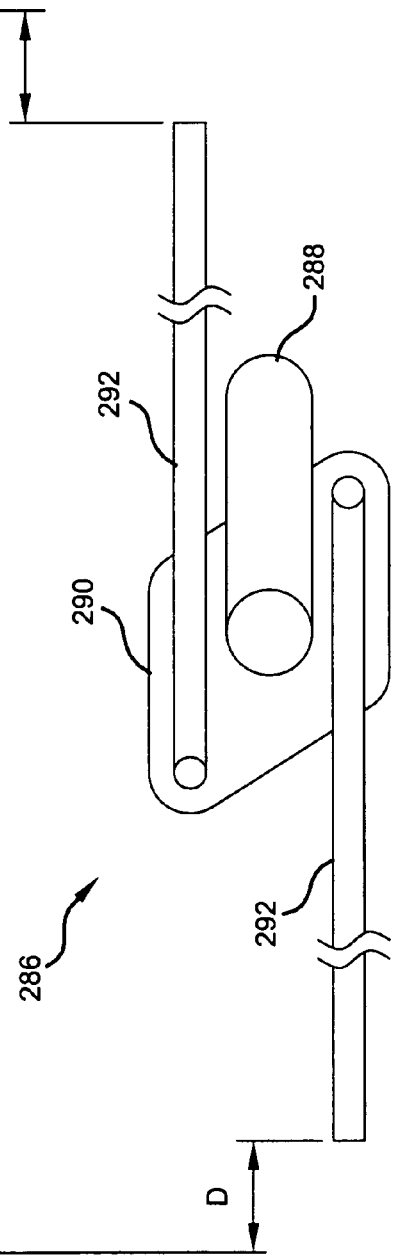

REMOVABLE T-TOP STOWAGE ON ROOF RACK

FIELD OF THE INVENTION

The present invention relates to removable vehicle panels and, more particularly to removable roof panels and stowage of same.

BACKGROUND AND SUMMARY OF THE INVENTION

Vehicles may include movable panels to provide a desirable appearance and experience. For example, movable roof panels can be utilized to provide an open environment for an occupant of a vehicle. In some vehicles, the movable panels are physically removed and separated from the vehicle. For example, a targa roof has a single roof panel that is removable from the roof structure. A vehicle with T-tops includes two roof panels that are each removable to allow occupants on opposite sides of the vehicle to individually experience an open environment.

The panels, once removed from the vehicle, need to be stowed in a location that protects the panels from damage. It is preferred that the panels be stowed on/with the vehicle so that they may be reinstalled as needed. Stowing of the removable panels within the vehicle, however, may take up valuable space and reduce the storage capacity of the vehicle. Thus, it would be advantageous to stow the removable panel on an exterior of the vehicle. Stowage of the panel on the exterior of the vehicle may increase drag and thereby decrease the operating efficiency of the vehicle and/or provide an aesthetically-unpleasing appearance. Thus, it would be advantageous to stow the panel in an aesthetically-pleasing orientation and/or with a minimal increase in drag. The removable panel may also have surfaces that need to be protected from the environment. For example, the removable panel may have finished portions, trim pieces, or the like that form a portion of the interior of the vehicle and/or are protected from the environment when positioned in the vehicle roof. When these panels are removed, these surfaces or portions of the panels need to be protected from the environment. Thus, it would be advantageous to provide exterior storage for the panels while protecting portions of the removable panel from the environment.

A vehicle panel stowage system according to the principles of the present invention advantageously provides for stowage of a removable vehicle panel on the exterior of the vehicle. Additionally, the removable vehicle panel stowage system advantageously protects portions of the removable panel from the environment when positioned in the stowed location.

In one aspect of the present invention, a removable roof panel system includes a stowage rack operable to be mounted to an exterior of a vehicle. The stowage rack advantageously includes a stowage area operable to secure the roof panel therein while being substantially flush with the stowage rack.

In another aspect of the present invention, the stowage rack encloses at least one side edge of a vehicle panel when disposed in the stowage area of the stowage rack. The removable panel stowage system thereby advantageously protects a portion of the panel from the environment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 7A and 7B are cross-sectional views showing the securing of a portion of the roof panel to the vehicle with a bayonet fitting;

FIGS. 8A and B are simplified schematic representations of the latching mechanism utilized with the removable roof panels of FIGS. 6A–C.

DETAILED DESCRIPTION OF THE PREFERRED EMBODIMENTS

The following description of the preferred embodiments is merely exemplary in nature and is in no way intended to limit the invention, its application, or uses.

Figure 1A:
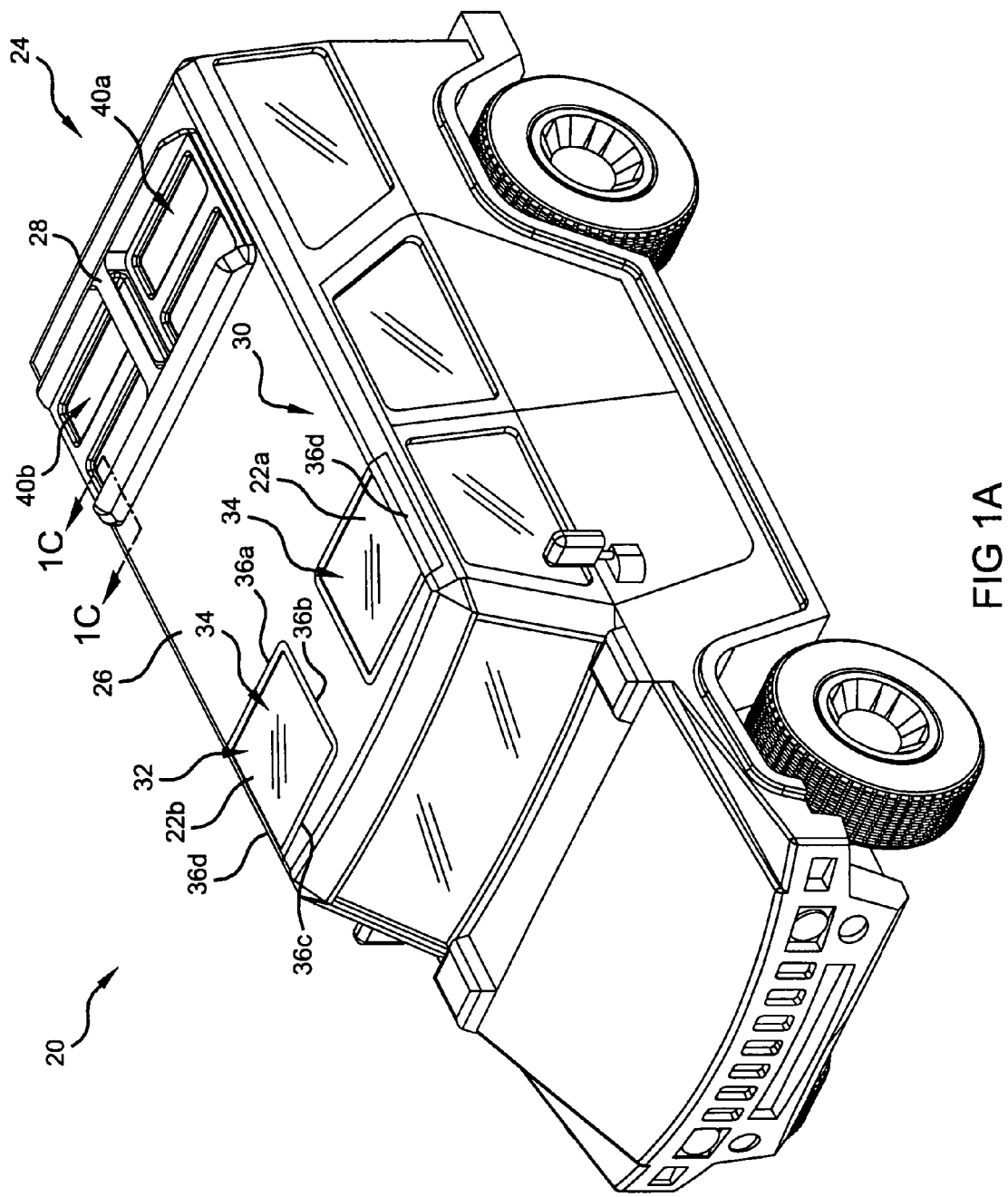
FIGS. 1A and B are perspective views of an automotive vehicle having a stowage system according to the principles of the present invention showing the removable roof panels installed on the vehicle roof and in the stowage system, respectively.
Figure 1B:
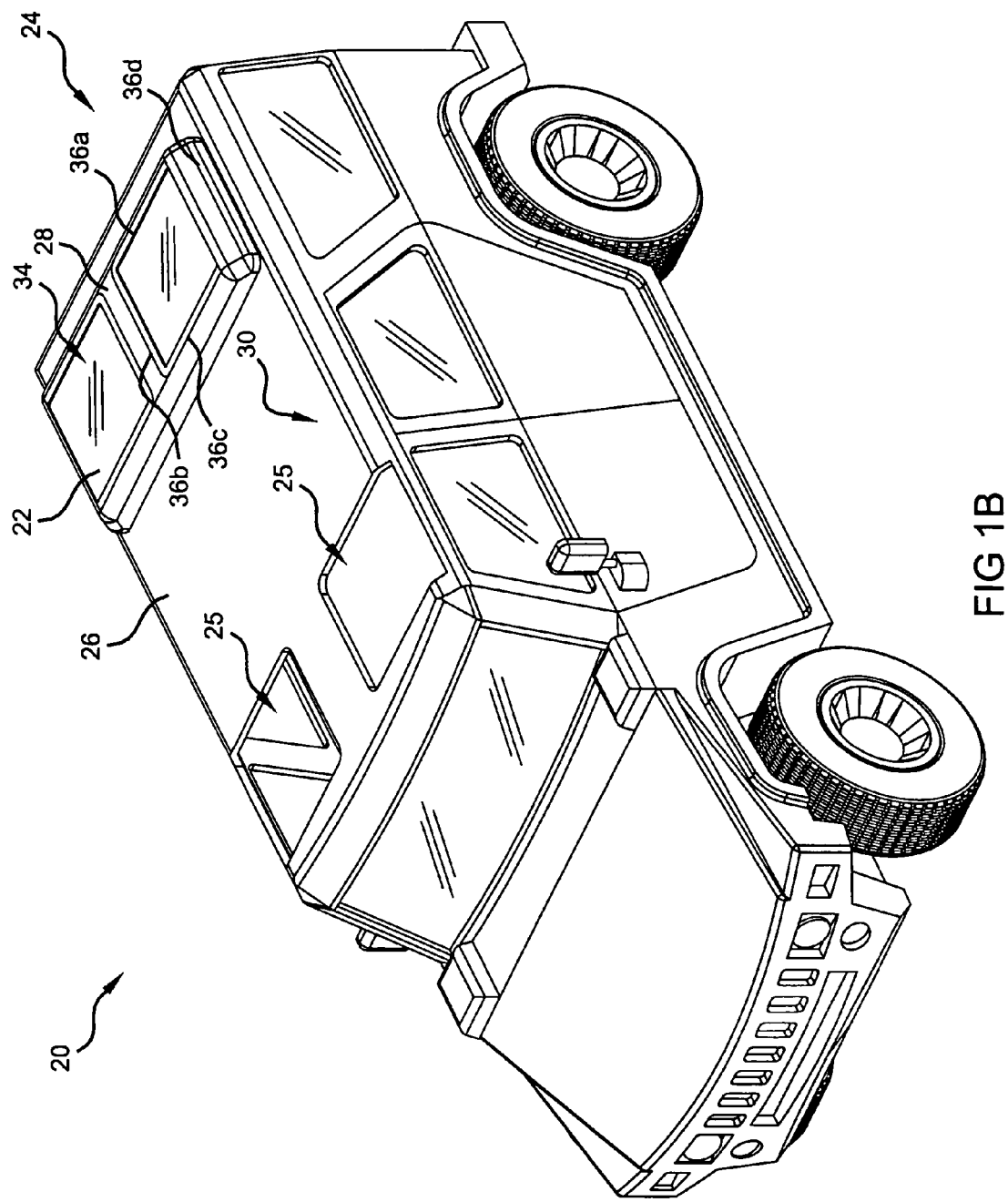
FIG. 1C is a fragmented cross-sectional view of a portion of the stowage rack along line C—C of FIG. 1A.

A vehicle 20 having removable roof panels 22 and a stowage system 24 according to the principles of the present invention is shown in FIGS. 1A and 1B. Panels 22 attach to openings 25 in roof 26 of vehicle 20 and form a portion of roof 26. Panels 22 can form various portions of roof 26. For example, panels 22 can be a single panel, such as a targa top (not shown) or multiple panels, such as T-tops, as shown. Additionally, the panels can be from portions of vehicle 20 other than roof 26. Panels 22 can be removed from roof 26 and stowed in a stowage rack 28 of stowage system 24 on an exterior 30 of vehicle 20.

In the embodiments shown, the present invention is substantially symmetrical about a fore-and-aft center line (not shown) of vehicle 20. Thus, in describing the present invention, only one half or side of vehicle 20, roof panels 22 and/or stowage system 24 may be described or referenced.

It should be appreciated, however, that the opposite side, where appropriate, is a mirror image of the side discussed.

Figure 2:
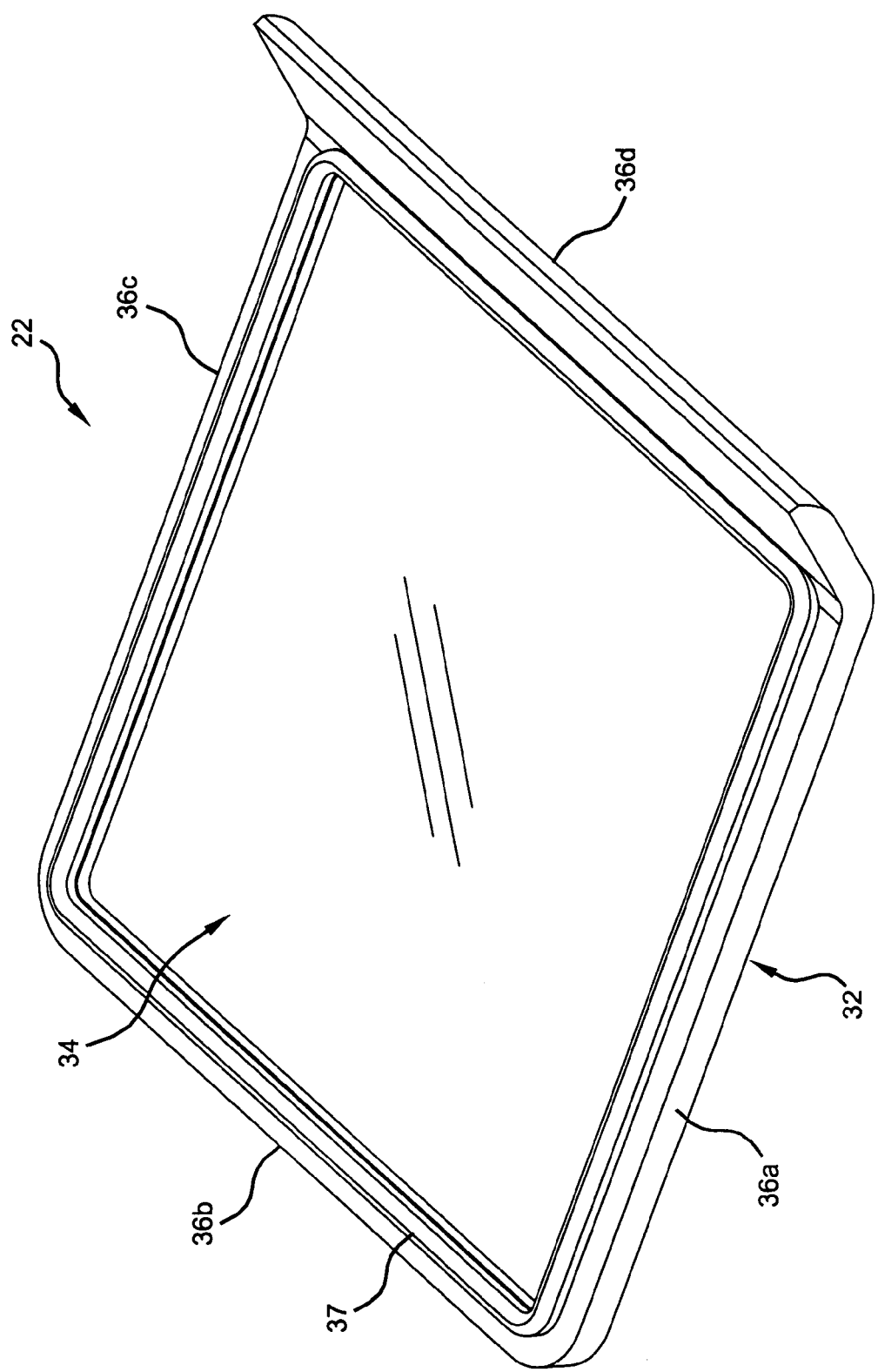
FIG. 2 is a perspective view of a removable roof panel of FIG. 1A.

Referring now to FIGS. 1A, 1B and 2, panels 22 have opposite exterior and interior surfaces 32, 34. Exterior surface 32 faces outwardly when panels 22 are disposed on roof 26 and when disposed on stowage rack 28. Side edges 36 of panels 22 define the perimeter of panel 22 and extend between exterior and interior surfaces 32, 34. Panels 22 can take a variety of shapes and configurations. The particular type of configuration of panel 22 will determine the number of side edges 36 that panel 22 has. A sealing member 37 may be provided on interior surface 34 and/or side edges 36 to form a weather-tight seal in roof opening 25 and in stowage rack 28. When panel 22 is attached to roof 26, three side edges 36a, b, c are protected from the environment while a fourth side edge 36d forms a portion of the side edge of roof 26. When panels 22 are stowed in storage rack 28, side edges 36a, b, c are also protected from the environment. Additionally, interior surface 34 is also protected from the environment when panel 22 is disposed in stowage rack 28, as described below. Moreover, the bottom surface or interior portion of side edge 36d is also protected from the environment when stowed within stowage rack 28, as described below.

Stowage rack 28 can come in a variety of forms and configurations to stow a roof panel 22 above roof 26 of vehicle 20. In the embodiments shown, wherein roof panels 22 are T-tops, stowage rack 28 includes two distinct stowage areas 40a, 40b that are configured to respectively stow roof panels 22a, 22b. It should be appreciated that if a single roof panel, such as a targa top, is utilized, stowage rack 28 would have a single stowage area. Stowage areas 40 are each defined by front and rear members 42, 44 that extend transversely along roof 26 and a center member 46 that extends in a fore-and-aft direction between front and rear members 42, 44. An intermediate member 48 extends between front and rear members 42, 44 and extends upwardly from roof 26 a substantially shorter distance than that of front, rear and center members 42, 44, 46. Each stowage area 40a, 40b thus provides a three-sided receptacle for each roof panel consisting of a portion of front member 42, rear member 44, and center member 46. This three-sided configuration is similar to opening 25 in roof 26 within which panels 22 are positioned when forming a portion of roof 26. Stowage rack 28 can be attached to roof 26 in a variety of manners. For example, stowage rack 28 may be attached to roof 26 with fasteners, such as bolts, and may include the use of backing plates with threaded openings therein.

Referring to FIG. 1C, a fragmented cross-sectional view of the portion of stowage rack 28 along line C—C of FIG. 1A is shown. A sealing member 50 is disposed between exterior surface 30 of roof 26 and the bottom surface of stowage rack 28. Sealing member 50 extends around an entire perimeter of stowage rack 28 to provide a weather-tight seal between the lower portion of stowage rack 28 and exterior surface 30 of roof 26 of vehicle 20. It should be appreciated that sealing member 50 can be a single continuous sealing member or comprised of a plurality of discrete sealing members. Optionally, stowage rack 28 may include a sealing member 52 disposed along the inside edge of each stowage area 40 to provide a weather-tight seal against side edges 36 and/or interior surface 34 of panels 22 when disposed therein. Sealing member 52 can be a single continuous sealing member or be comprised of a plurality of discrete individual sealing members arranged relative to one another to form a weather-tight seal with a panel 22. It should be appreciated that sealing members can be used on stowage rack 28, roof openings 25 and/or roof panels 22 to provide a weather-tight seal between roof panel 22 and roof opening 25 and stowage rack 28. It should be further appreciated that a combination of sealing members on any or all of these different components can be employed, as desired, to provide the desired weather-tight seal between panel 22 and stowage rack 28 and roof opening 25.

The three-sided configuration for stowage areas 40 advantageously protects three side edges 36a, 36b, 36c of panel 22 when stowed therein. Additionally, side edge 36d of panel 22 extends between front and rear members 42, 44 adjacent the edge of roof 26. With seal 50 disposed between stowage rack 28 and roof 26, and with a sealing member on panel 22 and/or stowage rack 28, a weather-tight stowage area 40 is formed when roof panel 22 is disposed therein. The weather-tight nature of stowage area 40 shields the interior surface 34 and side edges 36a, 36b, 36c from the environment thereby protecting roof panel 22 when disposed within stowage rack 28.

Figure 3:
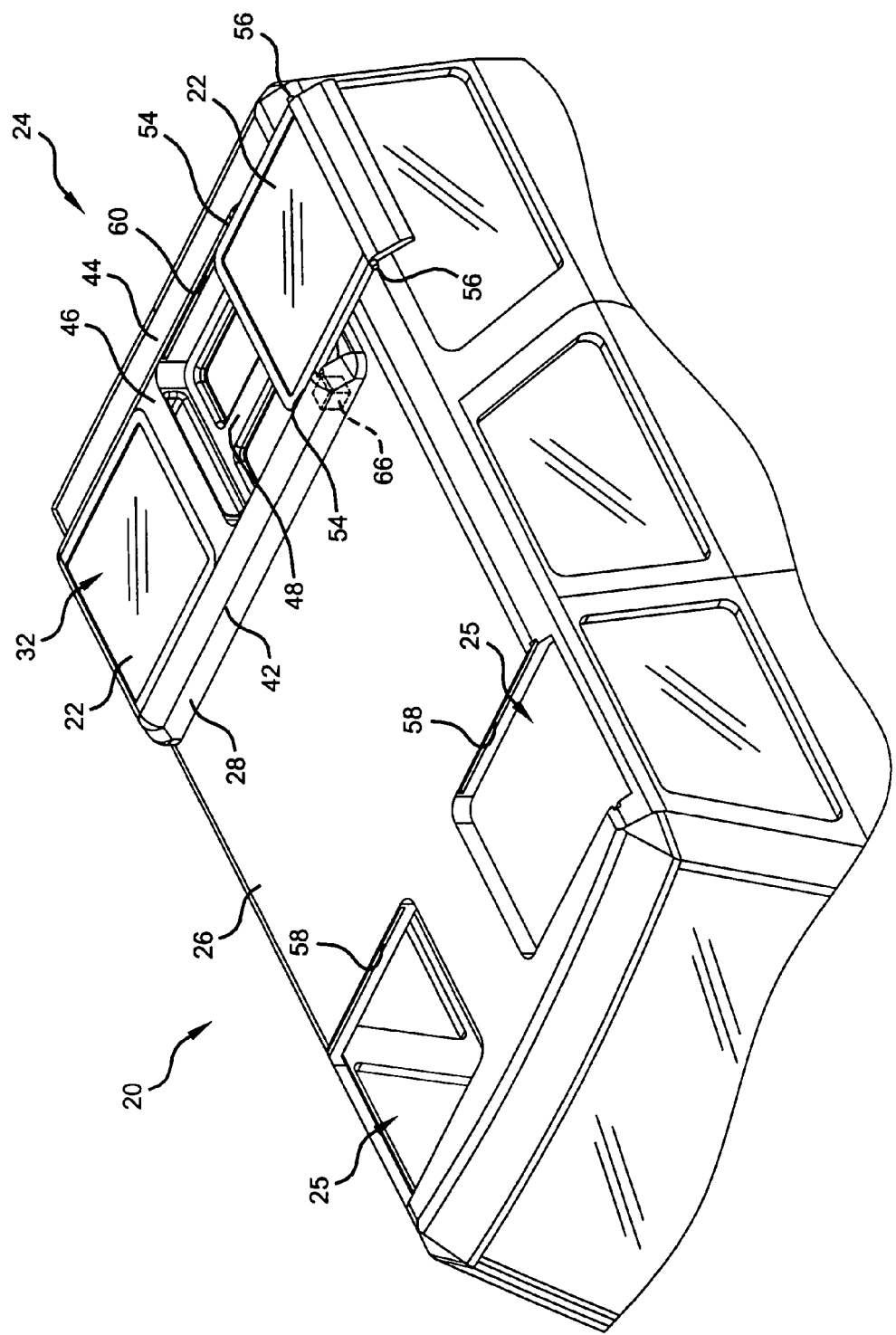
FIG. 3 is a perspective view of the first preferred embodiment of a stowage system according to the principles of the present invention with the removable roof panels being inserted into the stowage rack.

Referring now to FIG. 3, a first preferred embodiment of roof panel 22 and stowage system 24 is shown. In this embodiment, each roof panel 22 includes a pair of inboard guide pins 54 and a pair of outboard guide pins 56 that extend in a fore-and-aft direction outwardly from side edges 36a, 36c. Guide pins 54, 56 are configured to slide along and be disposed within tracks 58, 60 in roof opening 25 and stowage rack 28, respectively. To position panel 22 within stowage rack 28, inboard guide pins 54 are aligned with tracks 60 and panel 22 is pushed or moved toward the fore-and-aft center line (not shown) of vehicle 20. As roof panel 22 enters stowage area 40, outboard pins 56 also engage with track 60. Panel 22 is moved toward the center line of vehicle 20 until one or more of the outboard guide pins 56 engage with a retaining mechanism 66 of stowage system 24. Retaining mechanism 66 can be disposed within front member 42 and/or rear member 44. Retaining mechanism 66 engages an outboard guide pin 56 and secures roof panel 22 within stowage area 40 on stowage rack 28. The engagement between outboard guide pin 56 and retaining mechanism 66 prevents the inadvertent or accidental removal of panel 22 from stowage rack 28.

Figure 4B:
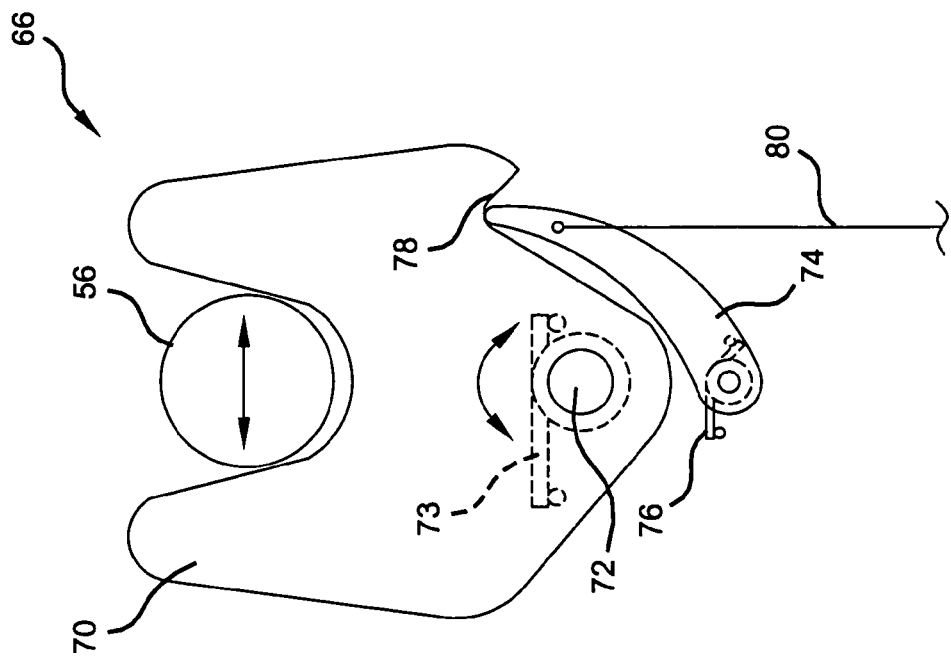
FIGS. 4A and 4B are simplified schematic representations of the retaining mechanism in the open and latched positions, respectively, utilized to secure the roof panels in the stowage rack of FIG. 3.
Figure 4A:
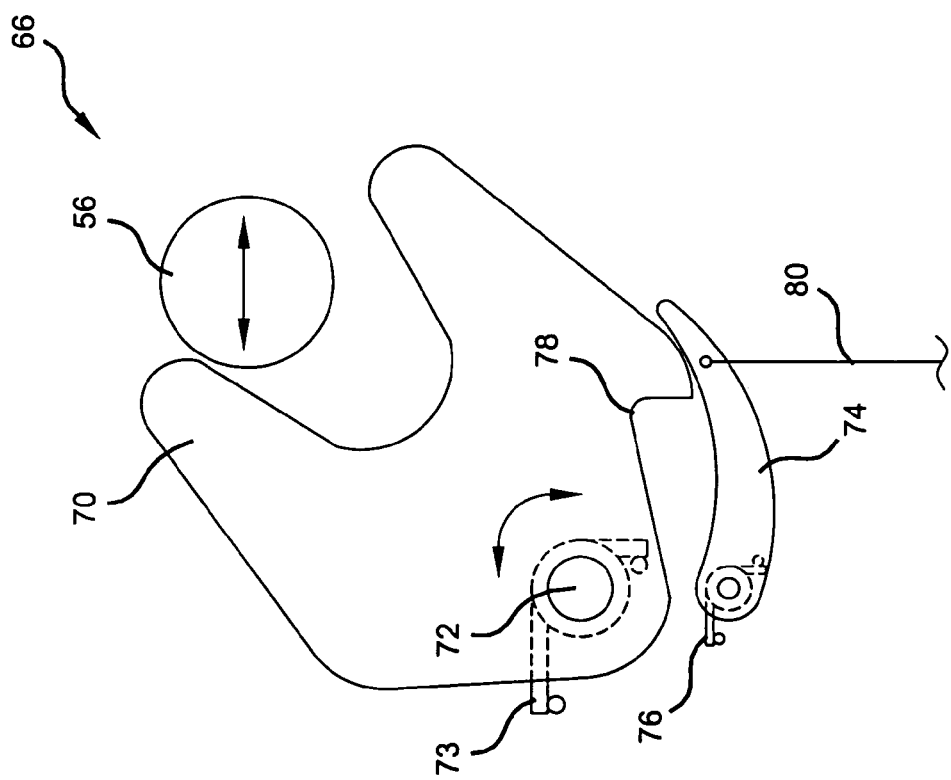

Retaining mechanism 66 can take a variety of forms. For example, as shown in FIGS. 4A and 4B, retaining mechanism 66 can include a rotatable latching member 70 that is operable to engage guide pin 56 to retain roof panel 22 within stowage rack 28. Latching member 70 is rotatable about pivot 72 between an open position, shown in FIG. 4A, to a locked position, shown in FIG. 4B. A biasing member 73, in this case in the form of a torsion spring, biases latching member 70 toward the open position. When in the open position, outboard guide pin 56 is free to move toward and engage with latching member 70. When guide pin 56 engages latching member 70, continued movement of guide pin 56 causes latching member 70 to rotate about pivot 72 toward its locked position. When latching member 70 rotates a sufficient distance, latching member 70 is locked in place and prevents outward (outboard) movement of guide pin 56 and, thus, secures roof panel 22 within stowage area 40 of stowage rack 28.

Latching member 70 can be secured in its locked position in a variety of manners. For example, a biased pivotable pawl 74 can be used. Pawl 74 rides along the surface of latching member 70 as latching member 70 moves from the open position to the locked position. Pawl 74 is biased toward latching member 70 by a biasing member 76, such as a torsion spring. Once latching member 70 has rotated a sufficient distance toward its locked position, pawl 74 engages with recess 78 on latching member 70 and thereby locks latching member 70 in the locked position. To release roof panel 22 from stowage rack 28, pawl 74 is rotated away from latching member 70. Pawl 74 can be rotated away from latching member 70 in a variety of ways. For example, a cable 80 (either manually or automatically driven) can be used to pull pawl 74 away from latching member 70 thereby releasing latching member 70 from the locked position. Biasing member 73 causes latching member 70 to move to the open position and allows removal of roof panel 22 from stowage rack 28.

It should be appreciated that the retaining mechanism 66 shown and disclosed in FIGS. 4A and 4B, is merely exemplary and that other retaining mechanisms can be employed. For example, a slam latch type latching mechanism, such as those employed on trunk or decklids of automotive vehicles, can be employed. For example, the decklid latch disclosed in U.S. Pat. No. 4,971,370, entitled "Self-Raising Decklid Latch," and the trunklid lock disclosed in U.S. Pat. No. 4,979,384, entitled "Trunklid Lock with Remote Release," the disclosures of which are incorporated herein by reference, can be used as the retaining mechanism. It should also be appreciated that retaining mechanism 66 can be released by a key mechanism that causes pawl 74 to disengage from latching member 70.

To retain roof panel 22 within roof opening 25, the same type of retaining mechanism may be employed. Alternatively, a manually-engageable pivoting latch member that grabs outboard guide pins 56 and secures them to vehicles 20 can also be employed. This is facilitated by the availability of access to the underside of roof panel 22 via the passenger area of vehicle 20. Thus, a different or same type of retaining mechanism can be utilized in roof opening 25 as is used in stowage rack 28.

Figure 5:
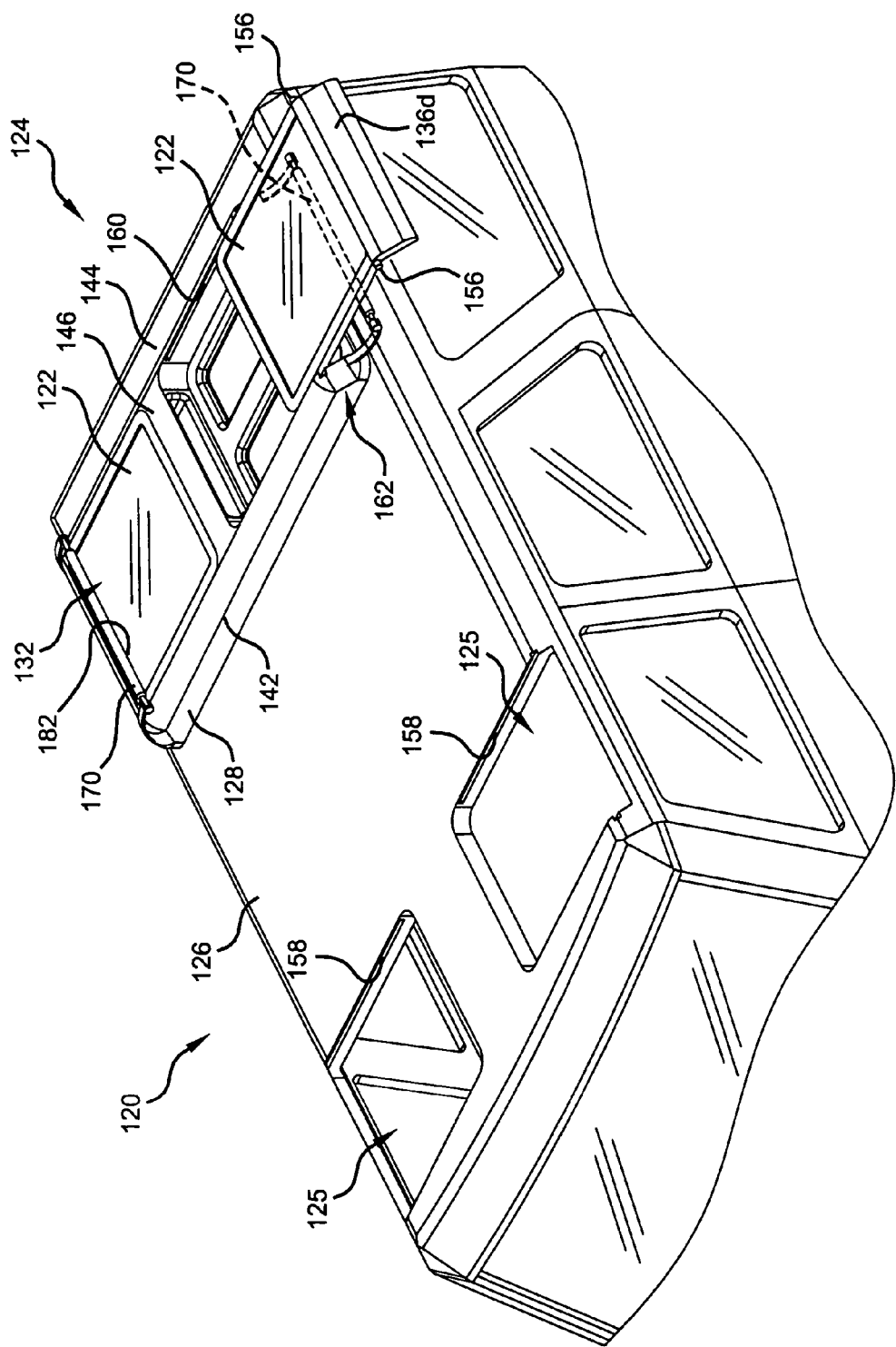
FIG. 5 is a perspective view of the second preferred embodiment of a stowage system according to the principles of the present invention.

Referring now to FIG. 5, a second preferred embodiment of a roof panel 122 and a stowage system 124 according to the principles of the present invention is shown. Roof panels 122 are substantially the same as those disclosed in the first preferred embodiment. As such, roof panels 122 are not discussed further. Stowage system 124, however, is different in the manner in which roof panels 122 are secured within stowage areas 140 of stowage rack 128. In this embodiment, an external latching member 170 is utilized to secure roof panel 122 to stowage rack 128. Latching member 170 is attached to the outboard portions of front and rear members 142, 144 of stowage rack 128. Latching member 170 is rotatable between open (shown on the driver's side) and closed (shown on the passenger side) positions. In the closed position, latching member 170 covers the openings 162 to tracks 160. In the open position, the openings 162 to tracks 160 are accessible.

To secure roof panel 122 within stowage rack 128, latching member 170 is rotated to the open position thereby exposing openings 162 of tracks 160. Inboard guide pins 154 are positioned within tracks 160 and roof panel 122 is moved toward the center line of the vehicle. As roof panel 122 approaches the center line, outboard guide pins 156 enter tracks 160. Roof panel 122 is continued to be moved toward the center line of the vehicle until roof panel 122 is completely positioned within stowage area 140. Latching member 170 is then rotated upwardly and toward the center line of the vehicle to thereby close openings 162 of tracks 160. When in the closed position, latching member 170 blocks openings 162 of track 160 and thereby prevents roof panel 122 from being removed therefrom. A padded portion 182 of latching member 170 engages against exterior surface 132 of panel 122. Padded portion 182 can be made from a variety of materials. For example, padded portion 182 can be made from a natural or synthetic rubber. The engagement of padded portion 182 with roof panel 122 further helps to secure roof panel 122 within stowage area 140.

Latching member 170 can be retained in the closed position in a variety of manners. For example, a simple four-bar mechanism wherein an over-center position occurs when latching member 170 is in a closed position can be utilized. Additionally, a retractable pawl can be used to engage against a portion of latching member 170 to retain latching member 170 in the closed position. Furthermore, a retaining mechanism, such as that discussed above with reference to the first preferred embodiment, could also be utilized. Moreover, latching member 170 could engage with a retaining or latching device, such as retaining mechanism 66 discussed above, the decklid latch disclosed in U.S. Pat. No. 4,971,370, entitled "Self-Raising Decklid Latch," and the trunklid lock disclosed in U.S. Pat. No. 4,979,384, entitled "Trunklid Lock with Remote Release," the disclosures of which are incorporated by reference above.

Figure 6A:
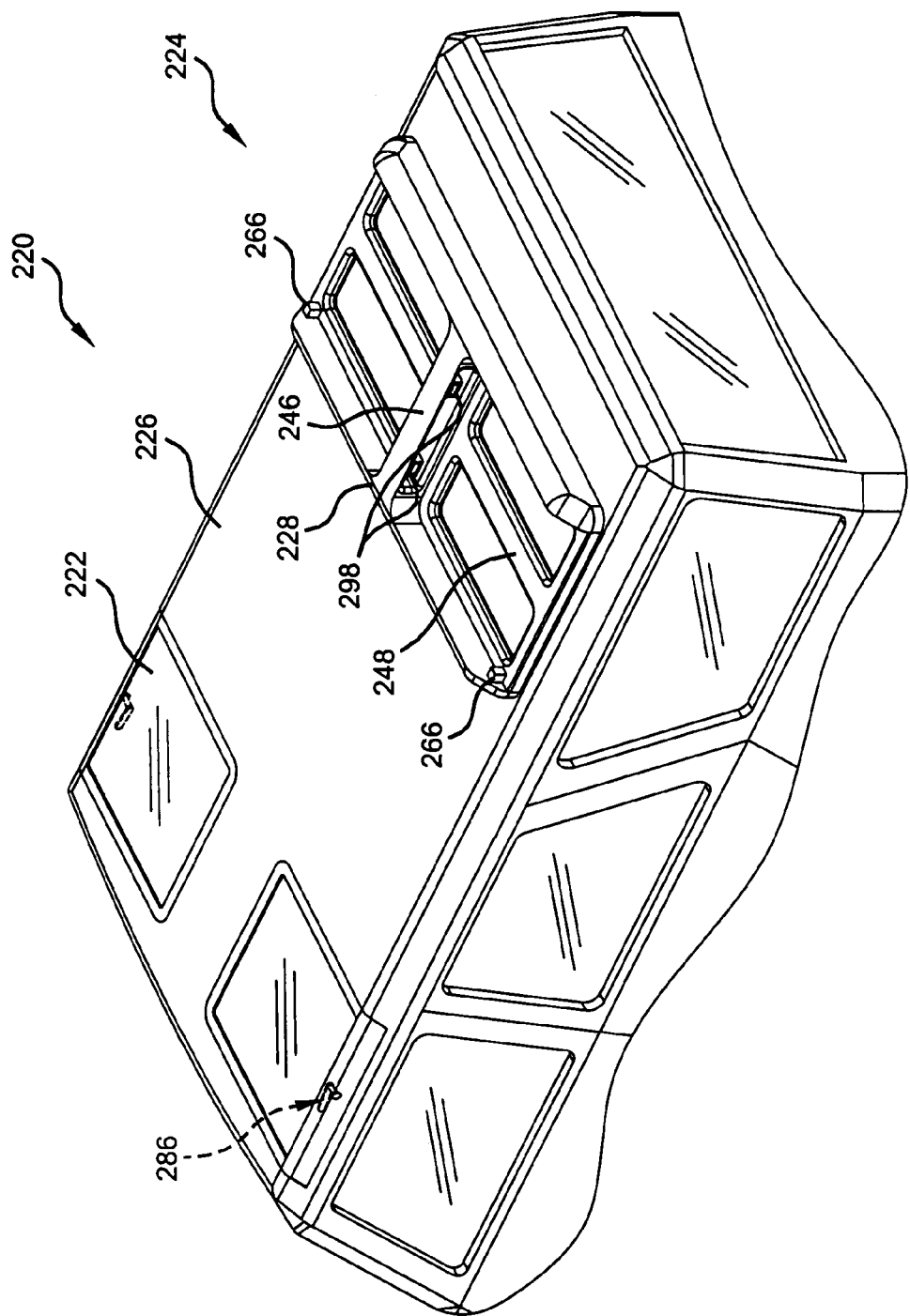
FIGS. 6A–C are perspective views of a third preferred embodiment of the stowage system according to the principles of the present invention with the roof panels installed on the vehicle roof, being removed from the vehicle roof, and stowed in the stowage rack, respectively.
Figure 6B:
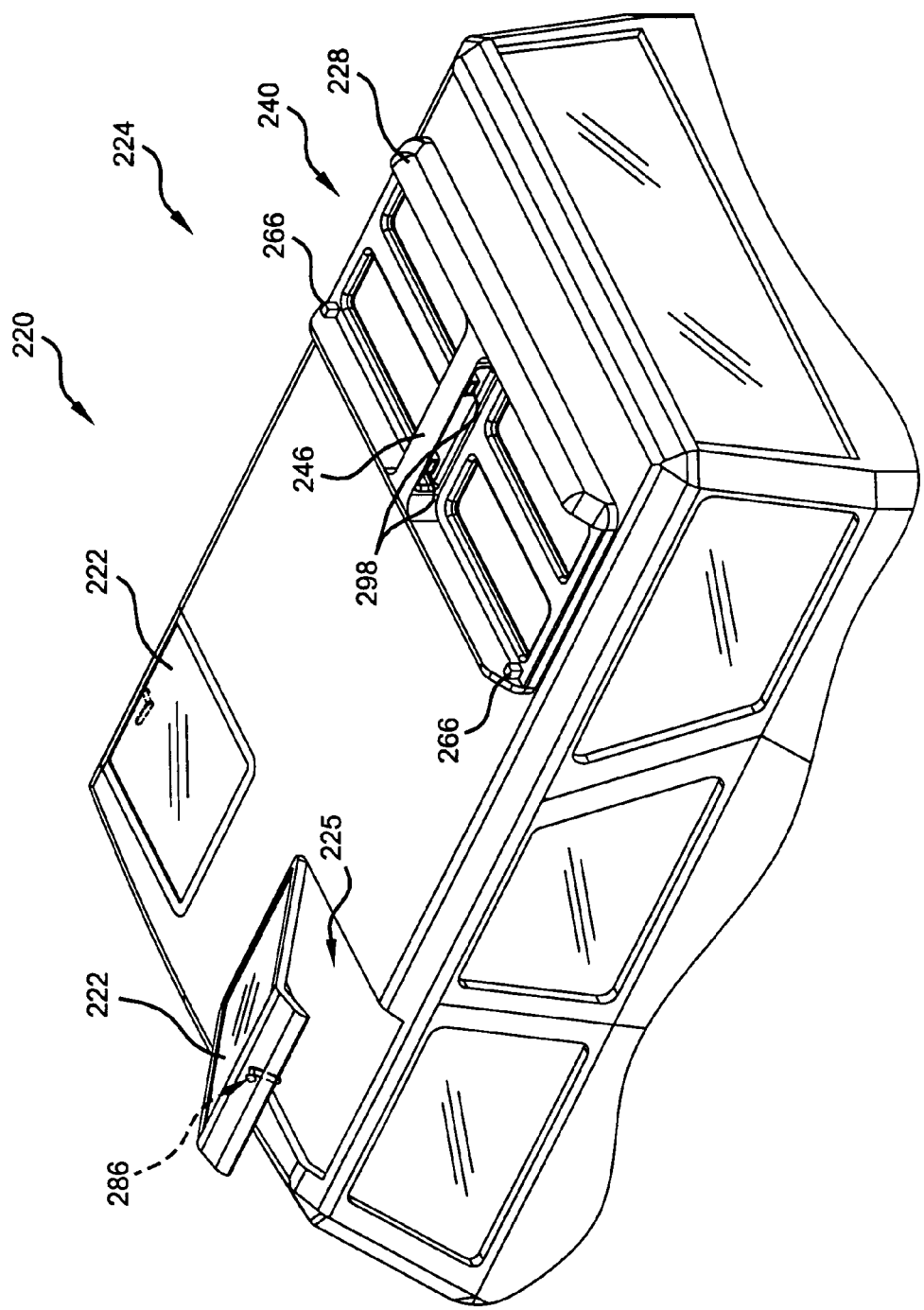
Figure 6C:
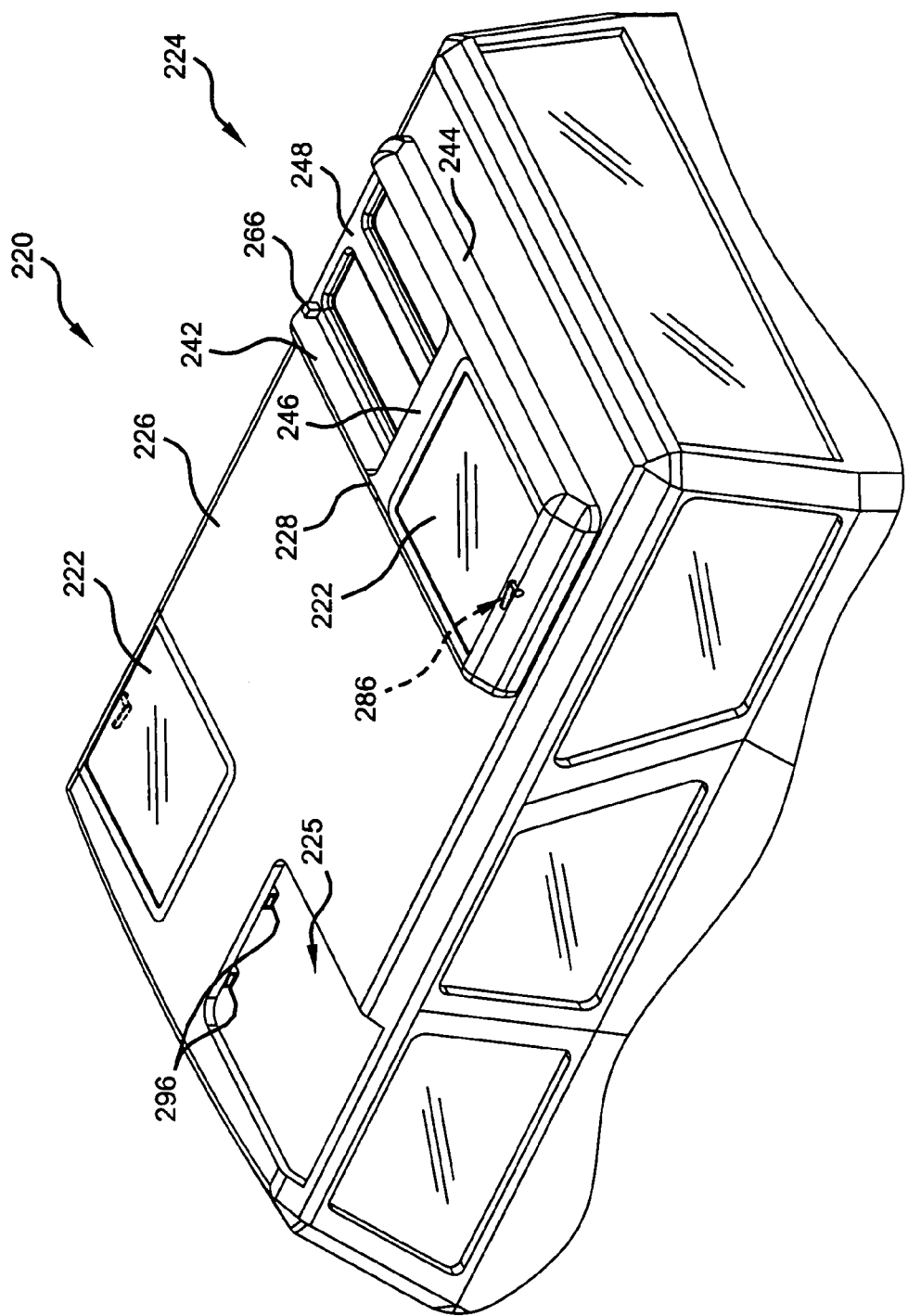

Referring now to FIGS. 6A–C, a roof panel 222 and stowage system 224 according to a third preferred embodiment of the present invention is shown. In this embodiment, roof panel 222 includes a rotatable latching mechanism 286 disposed along side edge 236d. Latching mechanism 286, shown in FIGS. 8A and B, includes a handle 288 operable to rotate a yoke 290. Rods 292 are pivotably attached to opposite ends of yoke 290. Rotation of handle 288 causes yoke 290 to rotate and move rods 292 relative to roof panel 222. Latching mechanism 286 is attached to the interior 234 along the outboard edge 236d of roof panel 222. Rotation of latching mechanism 286 causes rods 292 to move between extended positions, as shown in FIG. 8A, to retracted positions, as shown in FIG. 8B, by a distance D. Rotation of latching mechanism 286 causes rods 292 to move either away from one another or toward one another in a fore-and-aft direction (in the orientations of the panels shown in the drawings). A detent feature (not shown) may be used to retain handle 288, yoke 290 and rods 292 in the extended position. Roof opening 225 includes fixed recesses (not shown) into which rods 292 extend when panel 222 is disposed in opening 225 and latching mechanism 286 is in the closed position. When latching mechanism 286 is moved to the open position, rods 292 disengage from the recesses in roof opening 225 and enable roof panel 222 to be removed therefrom.

One or more bayonet members 294 (shown in FIGS. 7A and 7B) extend outwardly from side edge 236b of panel 222. Bayonet members 294 fit within complementary recesses 296 in roof opening 225 to secure side edge 236b of roof panel 222 within roof opening 225, as shown in FIGS. 7A and 7B. The installed and secured position is shown in FIG. 7B while the position shown in FIG. 7A corresponds to roof panel 222 being partially inserted (or partially removed) from roof opening 225. As can be seen in FIGS. 7A and 7B, in this embodiment sealing members 299 are disposed along roof opening 225 to provide a weather-tight seal between roof panel 222 and roof 226. If desired, a releasable locking feature can be added to latching mechanism 286 to secure and retain the latching mechanism in the closed and/or open position.

Roof panel 222 is removed from roof opening 225 by rotating latching mechanism 286 to the open position. Roof panel 222 is then rotated or lifted upwardly along outer edge 236d, as shown in FIG. 6B. This rotation of roof panel 222 disengages bayonet 294 from recess 296. Roof panel 222 is then pulled outwardly away from roof opening 225.

To stow roof panel 222 within stowage area 240 of stowage rack 228, latching mechanism 286 is rotated so that it is in the closed position with rods 292 in their fully-extended position and handle 288 in a position that will not interfere with positioning of roof panel 222 within stowage area 240. Roof panel 222 is then inserted at an angle into stowage area 240 by aligning bayonets 294 along side edge 236b with recesses 298 in center member 246 of stowage rack 228. Recesses 298 are of substantially the same configuration as recesses 296 in roof opening 225. With bayonets 294 engaged with recesses 298, roof panel 222 is then rotated downwardly and the ends of rods 292 engage with retaining mechanisms 266 disposed along the outboard sides of front and rear members 242, 244 of stowage rack 228. Retaining mechanisms 266 can be the same or similar to those disclosed above with reference to the first preferred embodiment. Retaining mechanisms 266 are utilized because access to the handle 288 of latching mechanism 286 is prevented by stowage rack 228. Roof panel 222 can be removed from stowage rack 228 by activating retaining mechanisms 266 to thereby release rods 292. Roof panel 222 can then be removed from stowage area 240 in a manner similar to that discussed above with reference to removing roof panel 222 from roof opening 225. If desired, a similar latching member as that disclosed above with reference to the second preferred embodiment (instead of retaining mechanism 266) could be utilized with latching mechanism 286 to secure roof panel 222 within stowage area 240.

Figure 9:
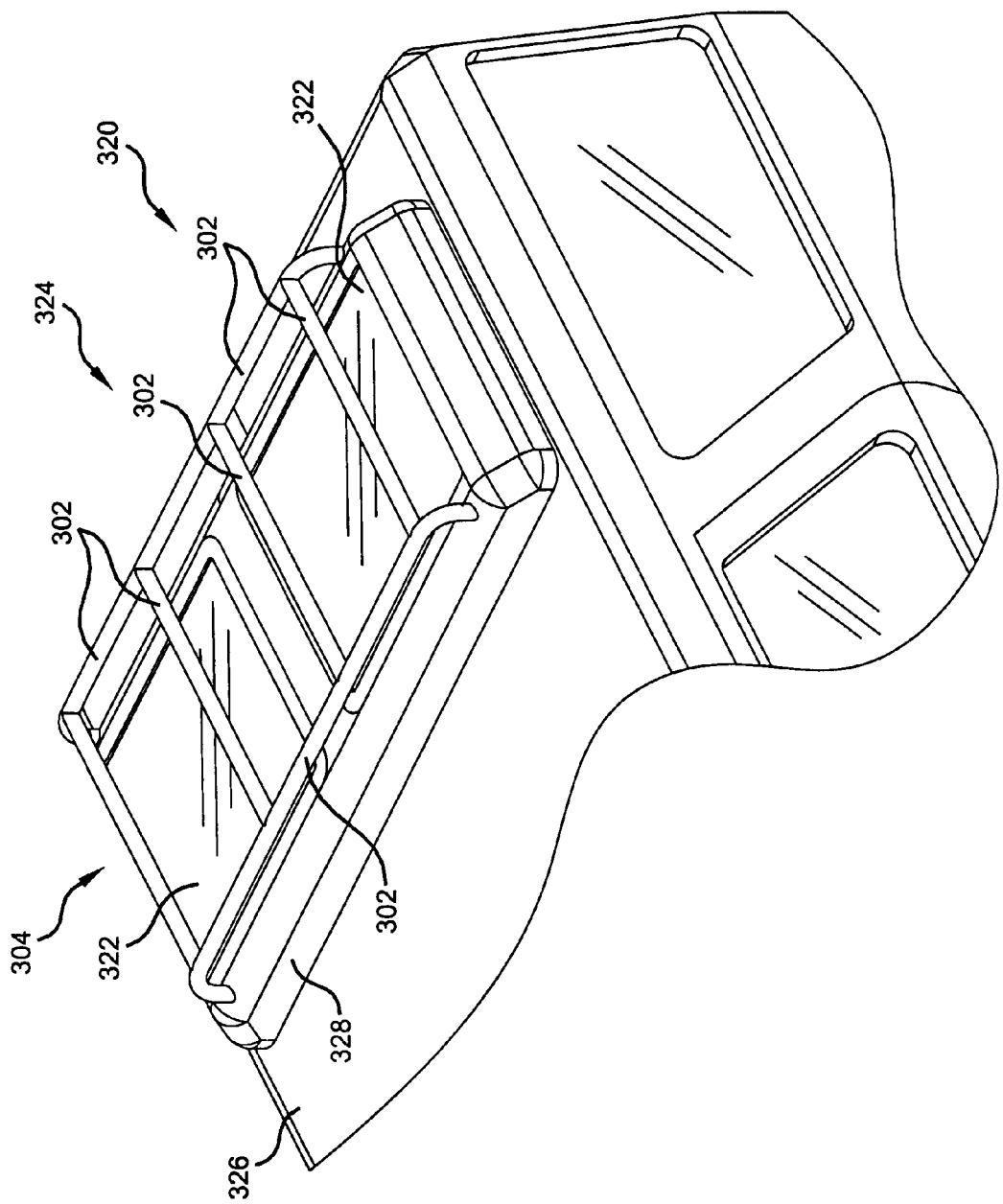
FIG. 9 is a perspective view of an alternate embodiment of a stowage rack for the stowage system according to the principles of the present invention incorporating a luggage rack in addition to the stowage rack.

Referring now to FIG. 9, an alternate configuration of a stowage rack according to the principles of the present invention is disclosed. In this alternate configuration, stowage rack 328 includes a plurality of support members 302 that extend above and between front, rear and center members 342, 344, 346 to provide a storage area 304 above stowage areas 340. Storage area 304 is operable to store objects, such as luggage, bags or other items in a secure location above stowage areas 340. Support members 302 support objects thereon in a spaced relation from any roof panels 322 stowed within stowage areas 340. The use of support members 302 thereby enables stowage rack 328 to stow roof panels 322 in addition to other objects on roof 326 of a vehicle 320.

Various materials of construction can be used to form the components utilized in the present invention. For example, the roof panels can be made of the same material as the roof of a vehicle or, alternatively, different materials. Such materials include, but are not limited to, plastics, polymers, metal, fiber-reinforced materials, glass and the like. Additionally, roof panels can be opaque, translucent, transparent or combinations thereof. The stowage rack can be made of metal, polymers or the like. Thus, the components used in the embodiments of the present invention can vary.

The stowage system according to the principles of the present invention advantageously provides stowage of removable panels. The panels are stowed in a substantially flush position with respect to the top of the stowage rack. That is, the top surface of the panel forms a substantially flush surface with the front and rear members of the stowage rack. Additionally, the panel is substantially parallel with the roof when in the stowage rack. The parallel and flush appearance provides an aesthetically-pleasing appearance while also reducing drag caused by stowing the panel on the roof. The stowing of the panels on the exterior of the vehicle advantageously allows the panels to be carried by the vehicle while not occupying valuable interior space of the vehicle. Additionally, the shielding of portions of the panels by the stowage system advantageously protects fragile or sensitive areas of the panels from damage during transport when in the stowed position. The providing of a weather-tight seal further facilitates the protection of various portions of the panels. Furthermore, the retaining features on the removable panel can be used to secure the panel to the vehicle body and to the stowage rack. Moreover, the same retaining features can be used on the vehicle body and on the stowage rack to secure the removable panel thereto. Thus, the stowage system according to the principles of the present invention provides advantageous stowage of removal panels of a vehicle.

While various aspects of the preferred embodiments of a stowage system according to the principles of the present invention have been disclosed, it should be appreciated that variations and changes to the embodiments shown can be implemented without departing from the spirit and scope of the present invention. For example, the various features disclosed in the preferred embodiments may be combined with one another in various configurations. Additionally, the specific retaining/latching mechanisms utilized to retain the roof panels within the roof of the vehicle and within the stowage rack can be different than those shown. Furthermore, the retaining/latching mechanisms can be positioned in other locations, such as along the center member of the stowage rack. Moreover, the stowage system can be used to accommodate the stowage of more than two roof panels. Furthermore, it should be appreciated that while the panels are shown as being roof panels, the stowage system can be utilized to stow other removable panels that are not roof panels. Additionally, the stowage rack may be positioned along exterior portions of the vehicle other than the roof, although all the advantages of the present invention may not be realized. Thus, while various configurations, materials and dimensions have been disclosed, other configurations, materials and dimensions can readily be used. It is intended by the following claims to cover these and any other departures from the disclosed embodiment which follows in the true spirit of this invention.

What is claimed is:

1. A removable roof panel stowage system comprising a stowage rack operable to be mounted to an exterior of a vehicle, the stowage rack including a stowage area operable to receive and secure a removable roof panel therein, and at least a portion of the roof panel being substantially coplanar with at least a portion of the stowage rack when disposed in the stowage area.

2. The removable roof panel stowage system of claim 1, further comprising a retaining mechanism operable to secure the roof panel in the stowage area of the stowage rack.

3. The removable roof panel stowage system of claim 2, wherein the retaining mechanism includes a member that moves as a result of the roof panel contacting the member when being positioned in the stowage area.

4. The removable roof panel stowage system of claim 1, wherein an interior surface of the roof panel is shielded from the environment when disposed in the stowage area.

5. The removable roof panel stowage system of claim 4, wherein a weather-tight seal is formed between the roof panel and the stowage rack.

6. The removable roof panel stowage system of claim 1, wherein the stowage rack and the roof panel when disposed in the stowage area form a substantially coplanar surface.

7. The removable roof panel stowage system of claim 1, wherein the roof panel is stowed substantially parallel to the exterior surface upon which the stowage rack is mounted.

8. The removable roof panel stowage system of claim 1, wherein the stowage rack includes a plurality of stowage areas each operable to receive and secure a roof panel therein.

9. The removable roof panel stowage system of claim 1, wherein said stowage area encloses at least one side edge of the roof panel when disposed therein.

10. The removable roof panel stowage system of claim 1, wherein the stowage rack includes support members operable to support objects in a spaced relation from a roof panel disposed in the stowage area.

11. A removable panel stowage system, the stowage system comprising a stowage rack operable to be mounted to an exterior of a vehicle, the stowage rack having at least one stowage area operable to receive and secure a removable vehicle panel therein, and the stowage rack enclosing an entirety of at least one side edge of the vehicle panel when disposed in the stowage area.

12. A removable panel stowage system, the stowage system comprising a stowage rack operable to be mounted to an exterior of a vehicle, the stowage rack having at least one stowage area operable to receive and secure a removable vehicle panel therein, wherein the stowage rack shields an entire interior surface of the vehicle panel from the environment when disposed in the stowage area.

13. The stowage system of claim 12, wherein a weather-tight seal is formed between the vehicle panel and the stowage rack.

14. The stowage system of claim 11, wherein the stowage rack includes a retaining mechanism operable to secure the vehicle panel to the stowage rack.

15. The stowage system of claim 14, wherein the retaining mechanism includes a member that moves as a result of the vehicle panel contacting the member when being positioned in the stowage area.

16. The stowage system of claim 11, wherein the stowage rack encloses at least three side edges of the vehicle panel when disposed in the stowage area.

17. A removable panel stowage system, the stowage system comprising a stowage rack operable to be mounted to an exterior of a vehicle, the stowage rack having at least one stowage area operable to receive and secure a removable vehicle panel therein, and the stowage rack enclosing at least one side edge of the vehicle panel when disposed in the stowage area, wherein the stowage rack includes a plurality of stowage areas each operable to receive and secure a removable vehicle panel therein and the stowage rack enclosing at least one side edge of each of the vehicle panels when disposed in the stowage areas.

18. The stowage system of claim 11, wherein the vehicle panel is stowed substantially flush with the stowage rack when disposed in the stowage area.

19. The stowage system of claim 11, further comprising a vehicle having an exterior surface upon which the stowage rack is mounted and the vehicle having a removable roof panel operable to be stowed in the stowage area of the stowage rack when removed from a roof of the vehicle.

20. The stowage system of claim 11, wherein the vehicle panel is a removable roof panel.

21. A removable panel stowage system comprising a stowage rack configured to be attached to an exterior of a vehicle and at least one retaining mechanism coupled to the stowage rack and operable to secure a removable vehicle panel in a stowage area of the stowage rack, the retaining mechanism having a movable member that moves in response to the vehicle panel being positioned in the stowage area of the stowage rack.

22. The removable panel stowage system of claim 21, wherein the movable member secures the vehicle panel in the stowage area.

23. The removable panel stowage system of claim 22, wherein the movable member moves as a result of a retaining feature on the vehicle panel contacting the movable member.

24. The removable panel stowage system of claim 22, wherein the movable member rotates.

25. The removable panel stowage system of claim 21, wherein the removable vehicle panel is a removable roof panel.

26. A removable panel stowage system comprising:
a removable vehicle panel having retaining features thereon;
an opening in a vehicle within which the vehicle panel may be disposed; and
a stowage rack on an exterior of the vehicle within which the vehicle panel may be disposed,
wherein the same retaining features on the vehicle panel are used to secure the vehicle panel within both the opening in the vehicle and the stowage rack.

27. The removable panel stowage system of claim 26, wherein the opening in the vehicle includes multiple first attachment devices, the stowage rack includes multiple second attachment devices, and the first and second attachment devices both use the retaining features on the vehicle panel to secure the vehicle panel within the opening in the vehicle and within the stowage rack respectively.

28. The removable panel stowage system of claim 27, wherein some of the first attachment devices are the same as some of the second attachment devices.

29. The removable panel stowage system of claim 27, wherein some of the first attachment devices are different than some of the second attachment devices.

30. The removable panel stowage system of claim 26, wherein the retaining features are projecting members that project outwardly from the vehicle panel.

31. The removable panel stowage system of claim 26, wherein at least one of the retaining features is movable.

32. A method of stowing a removable vehicle panel on an exterior of a vehicle, the method comprising:
(a) removing the panel from the vehicle;
(b) positioning the panel in a stowage area of a stowage rack attached to an exterior of the vehicle, at least a portion of the panel being substantially coplanar with at least a portion of the stowage rack; and
(c) securing the panel to the stowage rack.

33. The method of claim 32, wherein (c) includes engaging the panel with a retaining mechanism on the stowage rack.

34. The method of claim 33, wherein (c) includes moving a movable member of the retaining mechanism with the panel when performing (b).

35. The method of claim 32, wherein (b) includes shielding an interior surface of the panel from the environment with the stowage rack.

36. The method of claim 35, wherein (b) includes forming a weather-tight seal between the panel and the stowage rack.

37. The method of claim 32, wherein (b) includes enclosing at least one side edge of the panel with the stowage rack.

38. The method of claim 32, wherein the panel is a roof panel.

39. The method of claim 32, wherein (b) includes positioning the panel below a support member operable to support an object in a spaced relation from the panel.

40. The removable roof panel stowage system of claim 1, wherein at least a portion of an exterior surface of the roof panel is substantially coplanar with at least a portion of a top surface of the stowage rack when disposed in the stowage area.

41. The stowage system of claim 12, wherein the stowage rack encloses an entirety of at least one side edge of the vehicle panel when disposed in the stowage area.

42. The method of claim 32, wherein (b) includes positioning the panel in the stowage area with at least a portion of an exterior surface of the roof panel being substantially coplanar with at least a portion of a top surface of the stowage rack.

* * * * *